United States Patent
Maruyama

(10) Patent No.: US 11,502,331 B2
(45) Date of Patent: Nov. 15, 2022

(54) METHOD FOR PRODUCING SULFIDE SOLID ELECTROLYTE

(71) Applicant: IDEMITSU KOSAN CO., LTD., Chiyoda-ku (JP)

(72) Inventor: Junpei Maruyama, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 142 days.

(21) Appl. No.: 16/468,360

(22) PCT Filed: Dec. 14, 2017

(86) PCT No.: PCT/JP2017/044896
§ 371 (c)(1),
(2) Date: Jun. 11, 2019

(87) PCT Pub. No.: WO2018/110647
PCT Pub. Date: Jun. 21, 2018

(65) Prior Publication Data
US 2020/0321652 A1 Oct. 8, 2020

(30) Foreign Application Priority Data
Dec. 14, 2016 (JP) .............. JP2016-242406

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ......... H01M 10/0562; H01M 10/0525; H01M 2300/0068
See application file for complete search history.

(56) References Cited

U.S. PATENT DOCUMENTS

| 4,599,284 A | 7/1986 | Akridge |
| 4,737,422 A * | 4/1988 | Knight ............... C08G 65/32 429/313 |
| 2010/0290969 A1 | 11/2010 | Deiseroth et al. |
| 2013/0177821 A1 * | 7/2013 | Tsuchida ............ H01M 4/485 429/323 |
| 2014/0302382 A1 | 10/2014 | Kambara et al. |

(Continued)

FOREIGN PATENT DOCUMENTS

| JP | 2011-150806 A | 8/2011 |
| JP | 2012-104279 A | 5/2012 |

(Continued)

OTHER PUBLICATIONS

International Search Report dated Jan. 23, 2018 in PCT/JP2017/044896, 1 pages.

(Continued)

*Primary Examiner* — Osei K Amponsah
(74) *Attorney, Agent, or Firm* — Oblon, McClelland, Maier & Neustadt, L.L.P.

(57) ABSTRACT

A method for producing a sulfide solid electrolyte, wherein lithium sulfide and a compound represented by the following formula (1) are used as raw materials: $PSX_3$ (1) (wherein, X is an element selected from F, Cl, Br and I.).

14 Claims, 2 Drawing Sheets

(56) References Cited

U.S. PATENT DOCUMENTS

| | | | |
|---|---|---|---|
| 2016/0104916 A1* | 4/2016 | Seino | H01M 10/0525 |
| | | | 429/189 |
| 2016/0104917 A1 | 4/2016 | Sato et al. | |
| 2016/0359194 A1 | 12/2016 | Meguro et al. | |
| 2017/0194662 A1 | 7/2017 | Kambara et al. | |

FOREIGN PATENT DOCUMENTS

| | | | |
|---|---|---|---|
| JP | 2013-037897 A | 2/2013 | |
| JP | 2013-201110 A | 10/2013 | |
| JP | 104241598 A | 12/2014 | |
| JP | 2015-72773 A | 4/2015 | |
| JP | 2015-214472 A | 12/2015 | |
| JP | 2016-167457 A | 9/2016 | |
| JP | 2016-207354 A | 12/2016 | |
| WO | WO 2014/192309 A1 | 12/2014 | |
| WO | WO 2017/159666 A1 | 9/2017 | |
| WO | WO 2017/159667 A1 | 9/2017 | |

OTHER PUBLICATIONS

English translation of the International Preliminary Report on Patentability and Written Opinion of the International Searching Authority dated Jun. 27, 2019 in PCT/JP2017/044896 filed Dec. 14, 2017, 6 pages.
Extended European Search Report dated Jun. 19, 2020 in European Patent Application No. 17880924.0, 7 pages.
Office Action dated Mar. 23, 2022, in corresponding Chinese Patent Application No. 201780076732.0.
Supplemental Search Report dated Aug. 4, 2022 in Corresponding Chinese Patent Application No. 201780076732.0.

* cited by examiner

METHOD FOR PRODUCING SULFIDE SOLID ELECTROLYTE

TECHNICAL FIELD

The invention relates to a method for producing a sulfide solid electrolyte.

BACKGROUND ART

With rapid spread of information-related equipment or communications equipment such as PCs, video cameras, and mobile phones in recent years, development of batteries used as a power source thereof has been considered to be important. Among the batteries, a lithium ion battery has attracted attention from a viewpoint of high energy density.

In the lithium ion battery that is currently commercially available, a liquid electrolyte containing a flammable organic solvent is used, and therefore attachment of a safety device that suppresses an increase in a temperature at the time of short circuit, or improvement in structural and material aspects for preventing short circuit is required. On the other hand, in the lithium ion battery formed into all-solid-state battery by using a solid electrolyte in place of the liquid electrolyte, it is considered that the flammable organic solvent is not used in the battery, and therefore the safety device can be simplified, and the lithium ion battery is excellent in a production cost or productivity.

As the solid electrolyte used in the lithium ion battery, a sulfide solid electrolyte is known. Above all, the sulfide solid electrolyte containing halogen as a constituent element has been reported to have improved ion conductivity or stability, and therefore has been positively researched in recent years. For example, Patent Document 1 discloses a sulfide solid electrolyte containing Li, P, S and halogen (I, Br, Cl) as the constituent elements.

However, development of a production method suitable for mass production and further improvement in ion conductivity have been required.

RELATED ART DOCUMENTS

Patent Documents

Patent Document 1: JP-A-2013-201110
Patent Document 2: JP-A-2015-214472

SUMMARY OF INVENTION

When a sulfide solid electrolyte containing halogen as a constituent element is produced, use of lithium halide or phosphorus halide is known as a supply source of the halogen. However, when lithium halide is used, synthesis treatment for a long period of time has been required for obtaining the solid electrolyte having high ion conductivity. Further, it is not easy to remove moisture from lithium halide, and a problem of requiring treatment for a long period of time or special facilities for sufficient drying has remained (see Patent Document 2).

Further, when phosphorus halide is used as a raw material, a problem of lower ion conductivity of a solid electrolyte obtained than in the case of using lithium halide has remained.

One object of the invention is to provide a method for producing a sulfide solid electrolyte, in which a production time can be shortened. Further, another object of the invention is to provide a method for producing a sulfide solid electrolyte having high ion conductivity.

According to one embodiment of the invention, provided is a method for producing a sulfide solid electrolyte, in which lithium sulfide and a compound represented by the following formula (1) are used as raw materials:

$$PSX_3 \quad (1)$$

(wherein, X is an element selected from F, Cl, Br and I).

According to one embodiment of the invention, a method for producing a sulfide solid electrolyte, in which a production time thereof can be shortened, can be provided. Further, the method for producing the sulfide solid electrolyte having high ion conductivity can be provided.

MODE FOR CARRYING OUT THE INVENTION

Figure 1:
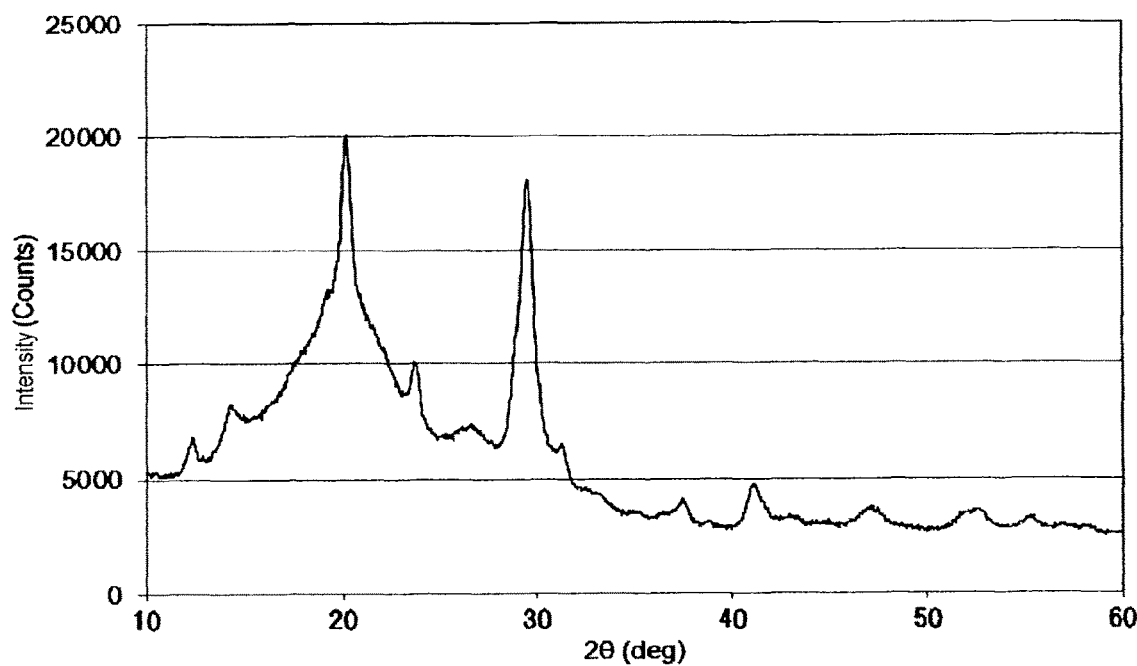
FIG. 1 shows an X-ray diffraction pattern of the sulfide solid electrolyte obtained in Example 1.

A method for producing a sulfide solid electrolyte according to one embodiment of the invention is characterized in that lithium sulfide ($Li_2S$) and a compound represented by the following formula (1) are used as raw materials:

$$PSX_3 \quad (1)$$

(wherein, X is an element selected from F, Cl, Br and I).

A production time of a solid electrolyte can be shortened by using the compound represented by the formula (1). Further, ion conductivity of the solid electrolyte obtained is increased. When lithium halide is used as a starting material, it is difficult to disperse halogen uniformly into the solid electrolyte during synthesis. Further, it is not easy to remove moisture from lithium halide, and a long period of time is required for drying. Further, when phosphorus halide is used as the starting material, a side reaction occurs, and a unit causing low ion conductivity, such as a $P_2S_6^{4-}$ unit, is easily formed, and therefore it is estimated that the ion conductivity of the solid electrolyte obtained is decreased. On the other hand, by the use of the compound represented by the formula (1), halogen is easily dispersed uniformly into the solid electrolyte during synthesis, and an unwanted reaction is hard to occur, and therefore it is considered that the sulfide solid electrolyte having high ion conductivity can be produced by treatment for a short period of time.

Lithium sulfide used in the present embodiment is not particularly limited, but lithium sulfide with high purity is preferable. Lithium sulfide can be produced by the method described in JP-A-H07-330312, JP-A-H09-283156, JP-A-2010-163356 or JP-A-2011-84438, for example.

Specifically, lithium sulfide can be synthesized by allowing lithium hydroxide to react with hydrogen sulfide at 70° C. to 300° C. in a hydrocarbon-based organic solvent to form lithium hydrosulfide, and subsequently removing hydrogen sulfide from this reaction liquid (JP-A-2010-163356).

Further, lithium sulfide can be synthesized by allowing lithium hydroxide to react with hydrogen sulfide at 10° C. to 100° C. in an aqueous solvent to form lithium hydrosulfide, and subsequently removing hydrogen sulfide from this reaction liquid (JP-A-2011-84438).

Specific examples of the compound represented by the above-described formula (1) include $PSF_3$, $PSCl_3$, $PSBr_3$, $PSI_3$, $PSBr_2F$ and $PSCl_2F$. The compound is preferably $PSCl_3$, $PSBr_3$ or $PSI_3$. X in the above-described formula (1) is preferably Cl, Br or I.

The compound represented by the formula (1) can be synthesized by a known method. For example, the compound can be synthesized by allowing sulfur to react with phosphorus halide. Further, the compound can be synthesized by allowing halogen to react with phosphorus sulfide in the presence of red phosphorus. Further, a commercial item of the compound represented by the formula (1) may be used.

In the production method of the present embodiment, phosphorus sulfide may be used in addition to lithium sulfide and the compound represented by the formula (1). In the invention, phosphorus (P) and sulfur (S) are contained in the compound represented by the formula (1), and therefore an amount of use of phosphorus sulfide can be reduced than ever before.

Although commercially available phosphorus sulfide is sold as a single compound in the form of phosphorus pentasulfide ($P_2S_5$), for example, it is actually a mixture containing $P_4S_{10}$, $P_4S_9$, $P_4S_7$ or the like as a component. It is estimated that a pathway of forming the solid electrolyte is different depending on each component of $P_4S_{10}$, $P_4S_9$, $P_4S_7$ or the like, and therefore when phosphorus sulfide is used as a raw material, fine adjustment of a ratio of constituent elements of the solid electrolyte is difficult in several cases. In mass production, the solid electrolyte having identical performance is required to be stably produced. In the production method of the invention, the amount of use of phosphorus sulfide can be reduced than ever before, and therefore production stability of the sulfide solid electrolyte can be improved.

Specific examples of phosphorus sulfide include phosphorus trisulfide ($P_2S_3$) and phosphorus pentasulfide ($P_2S_5$). Phosphorus sulfide described above can be used alone in one kind, or in combination of two or more kinds. Above all, phosphorus pentasulfide is preferable. Phosphorus pentasulfide can be used without particular limitation. Phosphorus pentasulfide with high purity is preferable. Specifically, the purity is 90% or more, preferably 95% or more, and further preferably 99% or more. Here, the purity of phosphorus pentasulfide can be measured using $^{31}$P-NMR.

Further, in the production method of the present embodiment, a known compound may be added to the above-described raw materials for producing the sulfide solid electrolyte containing desired elements as the constituent elements, or the like within the range in which advantageous effects of the invention are not adversely affected. For example, an alkali metal element and/or a halogen element may be added thereto.

Specific examples thereof include $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl and NaBr. In addition, lithium halide (LiCl, LiBr, LiI or the like) may be added thereto.

A blending ratio of each compound in the above-described raw materials is not particularly limited, and can be appropriately set so as to become a desired ratio of the constituent elements of the sulfide solid electrolyte.

A kind of the element forming the sulfide solid electrolyte obtained by the production method of the invention can be confirmed by using an ICP emission spectrometer, for example.

Specific examples of a crystal structure of the sulfide solid electrolyte include a $Li_3PS_4$-type crystal structure, a $Li_4P_2S_6$-type crystal structure, a $Li_7PS_6$-type crystal structure, a $Li_7P_3S_{11}$-type crystal structure, a $Li_{4-x}Ge_{1-x}P_xS_4$ system thio-LISICON Region II-type crystal structure (refer to Kanno et al., Journal of The Electrochemical Society, 148 (7) A742-746 (2001)), a crystal structure similar to the $Li_{4-x}Ge_{1-x}P_xS_4$ system thio-LISICON Region II-type crystal structure (refer to Solid State Ionics, 177 (2006), 2721-2725), an argyrodite-type crystal structure (JP-T-2010-540396) and a structure similar thereto.

In X-ray diffractometry using CuKα rays, diffraction peaks of the $Li_3PS_4$ crystal structure appear in the vicinity of $2\theta=17.5$ deg, 18.3 deg, 26.1 deg, 27.3 deg and 30.0 deg, for example. Diffraction peaks of the $Li_4P_2S_6$ crystal structure appear in the vicinity of $2\theta=16.9$ deg, 27.1 deg and 32.5 deg, for example. Diffraction peaks of the $Li_7PS_6$ crystal structure appear in the vicinity of $2\theta=15.3$ deg, 25.2 deg, 29.6 deg and 31.0 deg, for example. Diffraction peaks of the $Li_7P_3S_{11}$ crystal structure appear in the vicinity of $2\theta=17.8$ deg, 18.5 deg, 19.7 deg, 21.8 deg, 23.7 deg, 25.9 deg, 29.6 deg and 30.0 deg, for example. Diffraction peaks of the $Li_{4-x}Ge_{1-x}P_xS_4$ system thio-LISICON Region II-type crystal structure appear in the vicinity of $2\theta=20.1$ deg, 23.9 deg and 29.5 deg, for example. Diffraction peaks of the crystal structure similar to the $Li_{4-x}Ge_{1-x}P_xS_4$ system thio-LISICON Region II type appear in the vicinity of $2\theta=20.2$ deg and 23.6 deg, for example. Diffraction peaks of the argyrodite-type crystal structure appear in the vicinity of $2\theta=25.2$ deg in several cases, or appear also in the vicinity of $2\theta=15.3$ deg, 17.7 deg, 31.1 deg, 44.9 deg and 47.7 deg, for example, in several cases.

Here, positions of the diffraction peaks may be shifted within the range of ±0.5 deg.

The sulfide solid electrolyte obtained by the production method of the present embodiment may have the crystal structure specified by the above-described diffraction peaks. Further, the sulfide solid electrolyte may have the argyrodite-type crystal structure or the crystal structure similar to the thio-LISICON Region II type.

In the present embodiment, a composition ratio in the raw materials is preferably 3.0 to 7.0 in a molar ratio of lithium to phosphorus (Li/P), for example. Further, a molar ratio of sulfur to phosphorus (S/P) is preferably 3.0 to 6.0. Further, a molar ratio of halogen to phosphorus (X/P) is preferably 0.2 to 2.0.

As one example of the blending ratio of each compound in the raw materials, a case of producing the sulfide solid electrolyte having the crystal structure similar to the thio-LISICON Region II type, containing Li, P, S and halogen (I Br, Cl) as the constituent elements, and a case of producing the sulfide solid electrolyte having the argyrodite-type crystal structure will be described.

In the case of producing the sulfide solid electrolyte having the crystal structure similar to the thio-LISICON Region II type, various raw materials are preferably used to be in the following molar ratio in each element. More specifically, the molar ratio of lithium to phosphorus (Li/P) is preferably 3.0 to 4.0, and more preferably 3.2 to 3.7. Further, the molar ratio of sulfur to phosphorus (S/P) is preferably 3.5 to 4.5, and more preferably 3.7 to 4.2. Further, the molar ratio of halogen to phosphorus (X/P) is preferably 0.2 to 1.2, and more preferably 0.2 to 0.7.

As the raw materials, lithium sulfide, the compound represented by the formula (1) and phosphorus pentasulfide are preferably used, and in the above case, a ratio of lithium sulfide to phosphorus pentasulfide in the raw materials ($aLi_2S:bP_2S_5$, in a molar ratio) is ordinarily 60:40 to 90:10, preferably 68:32 to 85:15, and more preferably 77:23 to 81:19.

A ratio of a total of lithium sulfide and phosphorus pentasulfide to the compound represented by the formula (1) [$x(aLi_2S+bP_2S_5):y(PSX_3)$, in a molar ratio] is ordinary 80:20 to 99:1, preferably 90:10 to 99:1, and more preferably 91:9 to 97:3.

In the case of producing the sulfide solid electrolyte having the argyrodite-type crystal structure, various raw materials are preferably used to be in the following molar ratio in each element. More specifically, the molar ratio (Li/P) of lithium to phosphorus is preferably 4 to 7, and more preferably 5 to 6. Further, the molar ratio of sulfur to phosphorus (S/P) is preferably 3 to 6, and more preferably 4 to 5. Further, the molar ratio of halogen to phosphorus (X/P) is preferably 0.1 to 3, and more preferably 1 to 2.

As the raw materials, lithium sulfide, the compound represented by the formula (1) and phosphorus pentasulfide are preferably used, and in the above case, the ratio of lithium sulfide to phosphorus pentasulfide ($aLi_2S\ bP_2S_5$, in a molar ratio) in the raw materials is ordinarily 60:40 to 90:10, preferably 68:32 to 85:15, and more preferably 77:23 to 81:19.

A ratio of the total of lithium sulfide and phosphorus pentasulfide to the compound represented by the formula (1) [$x(aLi_2S+bP_2S_5):y(PSX_3)$, in a molar ratio] is ordinary 50:50 to 90:10, preferably 55:45 to 80:20, and more preferably 60:40 to 75:25.

In the production method of the present embodiment, lithium sulfide and the compound represented by the formula (1) as described above only need to be used as the raw materials, and a reactor or conditions are not particularly limited. Specific examples of the method for producing the sulfide solid electrolyte from the raw materials include a mechanical milling (MM) method, a melt quenching method, a method for bringing raw materials into contact with each other iii a hydrocarbon-based solvent (WO2009/047977), a method for alternately performing a means for bringing raw materials into contact with each other in a hydrocarbon-based solvent and a means for pulverization and synthesis (JP-A-2010-140893) and a method for performing a step of pulverization and synthesis after a step of bringing raw materials into contact with each other in a solvent (PCT/JP 2012/005992).

The above-described solvent may be a polar solvent or a nonpolar solvent. Specific examples of the nonpolar solvent include a hydrocarbon solvent. Specific examples of the hydrocarbon solvent include an aliphatic hydrocarbon solvent or an aromatic hydrocarbon solvent, in which an aromatic hydrocarbon solvent is preferable. As the aromatic hydrocarbon solvent, alkylbenzene is preferable. As alkylbenzene, toluene is preferable.

A temperature during production is not particularly limited, and can be appropriately set according to the conditions for producing a desired sulfide solid electrolyte. For example, when the sulfide solid electrolyte having the crystal structure similar to the thio-LISICON Region II type is produced, the temperature is preferably 0° C. or higher and 150° C. or lower, and more preferably 5° C. or higher and 140° C. or lower. Here, when a solvent is used, the temperature is preferably equal to or lower than a boiling point of the solvent.

Further, when the sulfide solid electrolyte having the argyrodite-type crystal structure is produced, the temperature is preferably 350° C. or higher and 650° C. or lower.

A treating time is not particularly limited, but is 1 hour or more and 72 hours or less, or 2 hours or more and 48 hours or less, for example.

The production method of the present embodiment preferably has a step of pulverizing the raw materials by using pulverization media (media) to allow the raw materials to react with each other. Specifically, it is preferable to mix the pulverization media to the raw materials to agitate the resultant mixture, thereby pulverizing the raw materials. Treatment by wet pulverization using the solvent is more preferable.

Specific examples of the pulverization media include balls of a ball mill and beads of a bead mill. The pulverization media is preferably made of zirconium, toughened alumina or alumina.

Specific examples of a pulverization method include a mechanical milling method and a slurry method in which the raw materials are allowed to react with each other in an organic solvent. Further, slurry containing the raw materials may be circulated between a pulverization mixer (pulverizer) and a temperature-holding chamber (reaction chamber) (JP-A-2010-140893).

Specific examples of the pulverization mixer can include a rotating mill (tumbling mill), a rocking mill, a vibrating mill, and a bead mill. From a viewpoint of excellent mass productivity, a bead mill is preferable.

The thus obtained sulfide solid electrolyte may be heat treated when necessary and formed into glass ceramics. A heat treatment temperature is preferably 160 to 350° C., for example. A heat treatment time is preferably 0.005 minute or more and 10 hours or less. The heat treatment time is further preferably 0.005 minute or more and 4 hours or less, and more preferably 1 minute or more and 3 hours or less.

A method for raising temperature is not particularly limited, and a temperature may be raised slowly or rapidly to a predetermined temperature.

The sulfide solid electrolyte obtained by the production method of the invention can be used for a material forming a lithium ion battery, such as a positive electrode, a negative electrode and an electrolyte layer. The lithium ion battery can be used in a mobile information terminal, a portable electronic device, a household small electric power storage system, and a motorcycle, an electric vehicle and a hybrid electric vehicle, each being powered by a motor, and so forth.

EXAMPLES

Production Example 1

[Production of lithium sulfide ($Li_2S$)]

Production and purification of lithium sulfide were performed as described below.

To a 500 L stainless steel reactor, as a water-insoluble medium, 303.8 kg of toluene (manufactured by Sumitomo Corporation) which was subjected to dehydration treatment to have a moisture content of 100 ppm when measured with a Karl Fischer moisture meter was put under nitrogen flow, and subsequently 33.8 kg of anhydrous lithium hydroxide (manufactured by The Honjo Chemical Corporation) was added, and a temperature was held at 95° C. while agitating the resultant mixture at 131 rpm with a TWINSTIR impeller.

The resultant slurry was heated to 104° C. while blowing hydrogen sulfide (manufactured by Sumitomo Seika Chemicals Co., Ltd.) into the slurry at a feed rate of 100 L per minute. Azeotropic gas of water and toluene was continuously discharged from the reactor. This azeotropic gas was condensed by using a condenser outside a system to remove moisture. During this period, toluene in the same amount as the toluene to be distilled off was continuously supplied thereto to hold a reaction solution level constant.

A moisture content in a condensate was gradually reduced, and distillation of water was not observed in 24 hours after introduction of hydrogen sulfide. Here, during the reaction, the reaction mixture was in a state in which a solid was dispersed and agitated in toluene, and no moisture separated from toluene was observed.

Then, a gas was exchanged from hydrogen sulfide to nitrogen, and circulated at 100 L per minute for 1 hour.

The solids obtained was collected by filtration, followed by drying to obtain lithium sulfide as white powder (purity: 98.5%).

Production Example 2

[Production of thiophosphoryl bromide ($PSBr_3$)]

Under a nitrogen atmosphere, 1.37 g of elemental sulfur (manufactured by Sigma-Aldrich Co. LLC) and 11.59 g of phosphorus tribromide (manufactured by Sigma-Aldrich Co. LLC) were put in a 50 mL Schlenk flask, and the resultant mixture was heated and stirred in an oil bath at 130° C. for 6 hours to obtain thiophosphoryl bromide as a yellow crystal.

Example 1

$Li_2S$ produced in Production Example 1, phosphorus pentasulfide ($P_2S_5$: manufactured by Thermophos International) and $PSBr_3$ produced in Production Example 2 were used as starting raw materials. Then, 10 g of a mixture prepared by adjusting these materials to $Li_2S:P_2S_5:PSBr_3$=71.25:18.75:5 in a molar ratio under a nitrogen atmosphere, and 600 g of zirconia balls having a diameter of 10 mm were put in an alumina pot (500 mL) of a planetary ball mill (manufactured by Fritsch Co. Ltd., model No. P-5), and completely sealed. Mechanical milling was performed in the planetary ball mill for 20 hours by adjusting the number of revolutions to 270 rpm to synthesize a sulfide solid electrolyte (glass).

Here, a composition ratio (Li:P:S:Br) of constituent elements in the raw materials was 3.35:1:4:0.35.

Under a nitrogen atmosphere, 0.5 g of the glass obtained was put in a Schlenk flask, and the Schlenk bottle was put in an oil bath previously heated to 206° C., and heat treated for 2 hours to obtain a sulfide solid electrolyte (glass ceramics).

Ion conductivity ($\sigma$) of the thus obtained glass ceramics was 4.3 mS/cm.

An X-ray diffraction pattern of the sulfide solid electrolyte is shown in FIG. 1. Peaks arising from a crystal structure similar to a thio-LISICON Region II type were observed at $2\theta$=20.2 deg and 23.6 deg.

Here, a method for measuring the ion conductivity and X-ray diffraction (XRD) is as described below.

(1) Ion Conductivity

A sulfide solid electrolyte was filled in tableting machinery, and a pressure of 22 MPa was applied thereto to obtain a molded body. Further, as an electrode, carbon was placed on both surfaces of the molded body, and pressure was applied again by the tableting machinery to prepare a molded body for conductivity measurement (diameter: about 10 mm, thickness: about 1 mm). Ion conductivity was measured on this molded body by AC impedance measurement. As a value of the conductivity, a numerical value at 25° C. was adopted.

(2) X-Ray Diffraction Measurement

Powder of a sulfide solid electrolyte was filled in a groove having a diameter of 20 mm and a depth of 0.2 mm by levelling off the powder using glass, and applied as a sample. Measurement was conducted using a Kapton film for XRD in order to avoid this sample contact with air. A position of a diffraction peak at $2\theta$ was determined by Le Bail analysis using an XRD analysis program RIETAN-FP.

Measurement was conducted using Powder X-ray Diffractometer D2 PHASER manufactured by Bruker Corporation under the following conditions.

Tube voltage: 30 kV
Tube current: 10 mA
X-ray wavelength: Cu-K$\alpha$ rays (1.5418 Å)
Optical system: concentration technique
Slit configuration: solar slit 4°, divergence slit 1 mm, K$\beta$ filter (Ni plate) being used
Detector: semiconductor detector
Measurement range: $2\theta$=10 to 60 deg
Step width, scan speed: 0.05 deg, 0.05 deg/sec In an analysis of a peak position for confirming presence of a crystal structure from the measurement results, the peak position was determined by correcting a baseline by Legendre orthogonal polynomials of the eleventh order using the XRD analysis program RIETAN-FP.

Comparative Example 1

$Li_2S$ produced in Production Example 1, $P_2S_5$ (manufactured by Thermophos International) and LiBr (manufactured by The Honjo Chemical Corporation) were used as starting raw materials. A sulfide solid electrolyte (glass ceramics) was obtained in the same manner as in Example 1 except that 10 g of a mixture prepared by adjusting these raw materials to $Li_2S:P_2S_5:LiBr$=63.75:21.25:15 in a molar ratio under a nitrogen atmosphere was used. Here, a composition ratio (Li:P:S:Br) of constituent elements in the raw materials was the same as the ratio in Example 1, which was 3.35:1:4:0.35.

Ion conductivity ($\sigma$) of the thus obtained glass ceramics was 3.6 mS/cm.

From the results in Example 1 and Comparative Example 1, it was able to be confirmed that, even if an element composition in the raw materials was the same, a sulfide solid electrolyte having different ion conductivity is obtained.

Example 2

Figure 2:
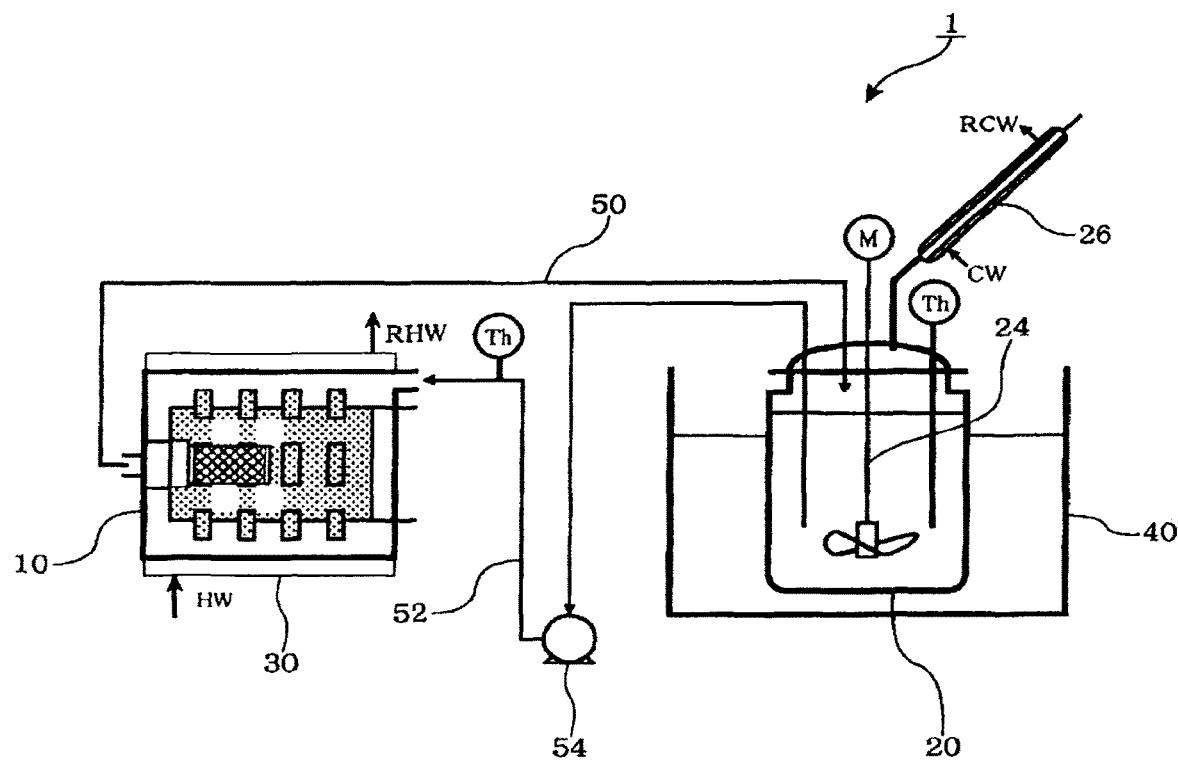
FIG. 2 shows a schematic diagram of the production apparatus used in Example 2.

A production apparatus shown in FIG. 2 was used. In an apparatus 1, a pulverization mixer 10 and a temperature-holding chamber (reaction chamber) 20 are connected with connecting pipes 50 and 52. While raw materials are pulverized and allowed to react with each other in the pulverization mixer 10 and the temperature-holding chamber 20, a suspension (slurry) containing the raw materials and a solvent is circulated between the pulverization mixer 10 and the temperature-holding chamber 20 through the connecting pipes 50 and 52 by a pump 54. Hot water (HW) enters a heater 30 and is discharged (RHW). While a temperature inside the pulverization mixer 10 is kept by the heater 30, the raw materials are being pulverized and allowed to react with each other to synthesize a solid electrolyte. While the temperature inside the temperature-holding chamber 20 is kept by an oil bath 40, the raw materials are allowed to react with each other in the solvent to synthesize the solid electrolyte. The temperature inside the temperature-holding chamber 20 is measured with a thermometer (Th). At this time, an impeller 24 is rotated by a motor (M) to agitate a reaction system to prevent the slurry from precipitating. Cooling water (CW) enters a cooling pipe 26 and is discharged therefrom (RCW). In the cooling pipe 26, a vaporized solvent inside the temperature-holding chamber 20 is cooled and liquefied, and returned to the temperature-holding chamber 20. A temperature of the slurry to be fed into the pulverization mixer 10 is measured with the thermometer (Th) provided in the connecting pipe 52 before the pulverization mixer 10.

Then, 456 g of 0.5 mmφ-zirconia balls was put in STAR-MILL (LMZ015) manufactured by Ashizawa Finetech Ltd. used as a pulverization mixer. A 2L-glass vessel equipped with a stirrer was used as a temperature-holding chamber. Production was performed under a nitrogen atmosphere.

As starting raw materials, 28.51 g of $Li_2S$ produced in Production Example 1, 35.57 g of $P_2S_5$ (manufactured by Thermophos international) and 12.92 g of $PSBr_3$ produced in Production Example 2 were used. Here, a composition ratio (Li:P:S:Br) of constituent elements in the raw materials was the same as the ratio in Example 1, which was 3.35:1:4:0.35. A suspension prepared by adding 770 g of dehydrated toluene to the raw materials was filled in the temperature-holding chamber.

A pump was driven at a flow rate of 350 mL per minute to start pulverization and reaction. The suspension was circulated between the temperature-holding chamber and an inside of a mill. The mill body was operated for 14 hours under conditions of a peripheral speed of 12 m/s by passing hot water therethrough by external circulation so as to hold a fluid temperature at 60° C. After the operation, the slurry was taken out, a supernatant was removed therefrom, and the resultant material was dried to obtain white sulfide solid electrolyte (glass) powder.

The glass powder was heat treated at 208° C. for 2 hours under vacuum to obtain sulfide solid electrolyte (glass ceramics) powder. Ion conductivity (σ) thereof was 3.38 mS/cm.

Comparative Example 2

Sulfide solid electrolyte (glass) powder was obtained in the same manner as in Example 2 except that 25.53 g of $Li_2S$ produced in Production Example 1, 40.35 g of $P_2S_5$ (manufactured by Thermophos International) and 11.13 g of LiBr (manufactured by The Honjo Chemical Corporation) were used as starting raw materials, and an operation time was adjusted to 15 hours. Here, a composition ratio (Li:P:S:Br) of constituent elements in the raw materials was the same as the ratio in Example 1, which was 3.35:1:4:0.35.

The glass powder was heat treated at 200° C. for 2 hours under vacuum to obtain sulfide solid electrolyte (glass ceramics) powder. Ion conductivity (σ) thereof was 3.04 mS/cm.

Comparative Example 3

Sulfide solid electrolyte (glass) powder was obtained in the same manner as in Comparative Example 2 except that an operation time was adjusted to 30 hours. The glass powder was heat treated at 200° C. for 2 hours under vacuum to obtain sulfide solid electrolyte (glass ceramics) powder. Ion conductivity (σ) thereof was 3.28 mS/cm.

From Example 2 and Comparative Examples 2 and 3, it was able to be confirmed that the sulfide solid electrolyte obtained by the production method of the invention has higher ion conductivity although a time of MM treatment was shorter than in the case where LiBr was used.

Example 3

$Li_2S$ produced in Production Example 1, $P_2S_5$ (manufactured by Thermophos International), thiophosphoryl chloride ($PSCl_3$, manufactured by Sigma-Aldrich Co. LLC, purity: 98%) and LiBr (manufactured by Sigma-Aldrich Co. LLC, purity: 99%) were used as starting raw materials. The raw materials were mixed to be 7.2:1.0:1.0:1.8 in a molar ratio ($Li_2S:P_2S_5:PSCl_3:LiBr$), specifically, 0.565 g of $Li_2S$, 0.379 g of $P_2S_5$, 0.289 g of $PSCl_3$ and 0.267 g of LiBr were mixed, and taken as a raw material mixture. Here, a composition ratio (Li:P:S:Cl:Br) of constituent elements in the raw materials was 5.4:1:4.4:1.0:0.6.

The raw material mixture and 30 g of zirconia balls having a diameter of 10 mm were placed in a zirconia pot (45 mL) of a planetary ball mill (manufactured by Fritsch Co. Ltd., model No. P-7), and completely sealed. An inside of the pot was made to an argon atmosphere. The raw material mixture was treated (mechanical milling) by the planetary ball mill for 40 hours by adjusting the number of revolutions to 370 rpm to obtain glassy powder (intermediate).

About 1.0 g of powder of the above-described intermediate was filled in a Tammann tube (PT2, manufactured by Tokyo Glass Instruments Co., Ltd.) in a glove box under an argon atmosphere, and a mouth of the Tammann tube was closed with quartz wool, and further sealed in a SUS closed container so as to prevent entry of air. Then, the sealed container was placed in an electric furnace (FUW243PA, manufactured by AdvanTech Co., Ltd.) and heat treated. Specifically, a temperature was raised from room temperature to 430° C. at a rate of 4.5° C./min, and held at 430° C. for 1 hour. Then, the powder was gradually cooled to obtain a sulfide solid electrolyte.

Ion conductivity (σ) of the sulfide solid electrolyte was 8.6 mS/cm.

Figure 3:
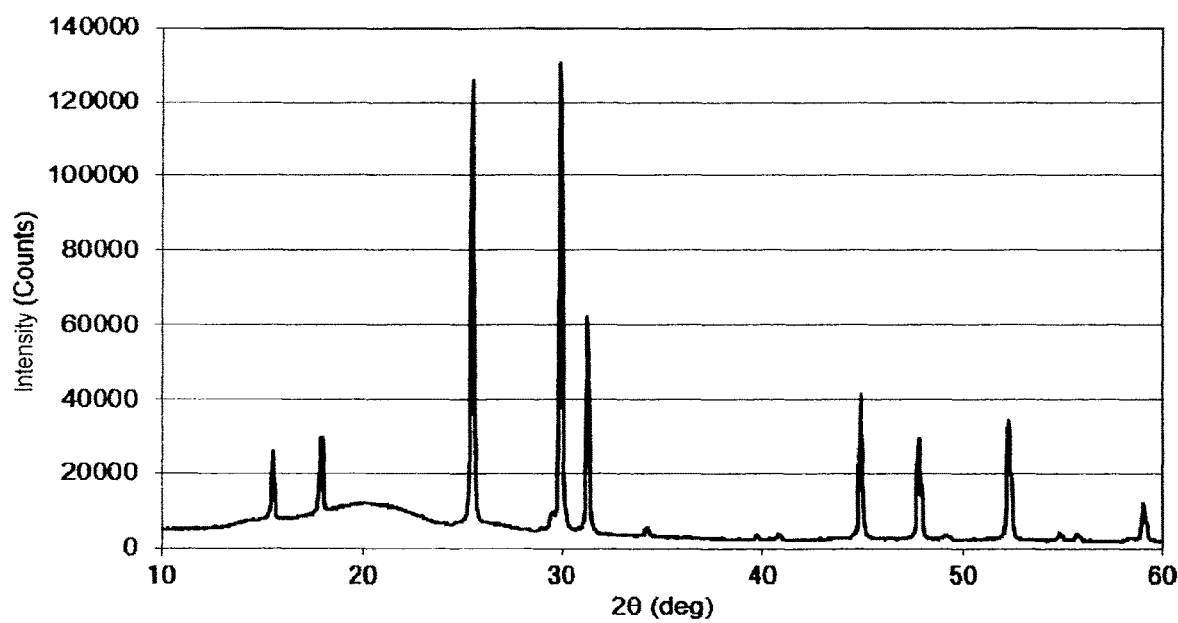
FIG. 3 shows an X-ray diffraction pattern of the sulfide solid electrolyte obtained in Example 3.

An X-ray diffraction (XRD) pattern of the sulfide solid electrolyte is shown in FIG. 3. Peaks arising from an argyrodite-type crystal structure were observed at 2θ=15.4 deg, 17.8 deg, 25.4 deg, 29.9 deg, 31.3 deg, 44.9 deg, 47.8 deg, and 52.3 deg.

Several embodiments and/or Examples of the invention have been described in detail above, but those skilled in the art will readily modify the exemplary embodiments and/or Examples without substantially departing from new teachings and advantageous effects of the invention. Accordingly, all such modifications are included within the scope of the invention.

The entire contents of the description of the Japanese application serving as a basis of claiming the priority concerning the present application to the Paris Convention are incorporated by reference herein.

The invention claimed is:

1. A method for producing a sulfide solid electrolyte, the method comprising pulverizing raw materials comprising;
   lithium sulfide; and
   a compound represented by formula (1):

$$PSX_3 \quad (1)$$

wherein X is an element selected from the group consisting of F, Cl, Br, and I, and
   wherein the sulfide solid electrolyte has a molar ratio of sulfur to phosphorus (S/P) of 3.0 to 6.0.

2. The method according to claim 1, wherein the raw materials further comprise phosphorus sulfide.

3. The method according, to claim 1, wherein X in the formula (1) is Cl, Br or I.

4. The method according to claim 1, wherein the raw materials are pulverized with pulverization media and allowed to react with each other.

5. The method accord to claim 4, wherein the pulverizing occurs in the presence of a solvent.

6. The method according to claim 1, wherein the compound has an argyrodite-type crystal structure, or a crystal structure similar to a thio-LISICON Region II type.

7. The method according to claim 1, wherein the molar ratio of sulfur to phosphorus (S/P) is 3.5 to 4.5.

8. The method according to claim 7, wherein the molar ratio of sulfur to phosphorus (S/P) is 3.7 to 4.2.

9. The method according to claim 1, wherein the sulfide solid electrolyte has a molar ratio of lithium to phosphorus of 3 to 7.0.

10. The method according to claim 9, wherein the sulfide solid electrolyte has a molar ratio of lithium to phosphorus (Li/P) of 3.0 to 4.0.

11. The method according to claim 10, wherein the sulfide solid electrolyte has a molar ratio of lithium to phosphorus (Li/P) of 3.2 to 3.7.

12. The method according to claim 1, wherein the sulfide solid electrolyte has a molar ratio of halogen to phosphorus (X/P) of 0.2 to 2.0.

13. The method according to claim 12, wherein the sulfide solid electrolyte has a molar ratio of halogen to phosphorus (X/P) of 0.2 to 1.2.

14. The method according to claim 13, wherein the sulfide solid electrolyte has a molar ratio of halogen to phosphorus (X/P) of 0.2 to 0.7.

* * * * *